United States Patent
Steinmeyer et al.

(10) Patent No.: US 11,459,108 B2
(45) Date of Patent: Oct. 4, 2022

(54) LIFE VEST CONTAINER DEVICE

(71) Applicant: RECARO Aircraft Seating GmbH & Co. KG, Schwaebisch Hall (DE)

(72) Inventors: Klaus Steinmeyer, Rosengarten (DE); Martin Roderwald, Fort Worth, TX (US); Daniel Jung, Schwaebisch Hall (DE); Michael Streckert, Schwaebisch Hall (DE); Thomas Schuler, Schwaebisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 362 days.

(21) Appl. No.: 16/598,085

(22) Filed: Oct. 10, 2019

(65) Prior Publication Data
US 2021/0107659 A1    Apr. 15, 2021

(51) Int. Cl.
| | | |
|---|---|---|
| G08B 13/14 | (2006.01) | |
| B64D 11/06 | (2006.01) | |
| G08B 29/12 | (2006.01) | |
| G08B 7/06 | (2006.01) | |
| B63C 9/08 | (2006.01) | |
| B64D 45/00 | (2006.01) | |
| B64F 5/60 | (2017.01) | |

(52) U.S. Cl.
CPC ............ *B64D 11/0631* (2014.12); *G08B 7/06* (2013.01); *G08B 13/149* (2013.01); *G08B 13/1418* (2013.01); *G08B 13/1472* (2013.01); *G08B 13/1481* (2013.01); *G08B 29/12* (2013.01); *B63C 9/08* (2013.01); *B64D 2045/007* (2013.01); *B64F 5/60* (2017.01)

(58) Field of Classification Search
CPC ............... B64D 11/0631; B64D 45/00; B64D 2045/007; G08B 7/06; G08B 13/1418; G08B 13/1472; G08B 13/1481; G08B 13/149; G08B 29/12; B64F 5/60; B63C 9/08
See application file for complete search history.

(56) References Cited

U.S. PATENT DOCUMENTS

| | | | |
|---|---|---|---|
| 7,965,200 B2 * | 6/2011 | Lamoree | B64D 11/04 340/945 |
| 10,152,855 B1 * | 12/2018 | Smith | G08B 13/1445 |

(Continued)

FOREIGN PATENT DOCUMENTS

| | | |
|---|---|---|
| EP | 2 420 445 A1 | 2/2012 |
| EP | 2 667 324 A2 | 11/2013 |

(Continued)

OTHER PUBLICATIONS

Search Report dated Mar. 3, 2021 issued in corresponding EP patent application No. 20200241.6.

*Primary Examiner* — Nay Tun
(74) *Attorney, Agent, or Firm* — Posz Law Group, PLC (57) ABSTRACT

The invention relates to a life vest container device, in particular aircraft seat life vest container device, for a life vest unit, with a life vest container comprising an accommodation unit that has an accommodation space as well as an access opening to the accommodation space, and with a monitoring device.

It is proposed that the monitoring device is at least configured to capture a change of at least one characteristic via at least one electric and/or electronic signal.

14 Claims, 5 Drawing Sheets

(56) References Cited

U.S. PATENT DOCUMENTS

| | | | |
|---|---|---|---|
| 10,577,063 B2* | 3/2020 | Schalla | B64D 11/0631 |
| 10,752,381 B2* | 8/2020 | Riera | B64D 11/0631 |
| 11,124,278 B2* | 9/2021 | Aruga | B63C 9/22 |
| 2004/0233054 A1* | 11/2004 | Neff | G06Q 20/203 |
| | | | 340/539.1 |
| 2007/0232164 A1* | 10/2007 | Swan | B64D 11/0631 |
| | | | 441/108 |
| 2007/0266782 A1 | 11/2007 | Bartz et al. | |
| 2009/0242695 A1 | 10/2009 | Lamoree et al. | |
| 2009/0309722 A1* | 12/2009 | Nichols | G08B 13/2402 |
| | | | 340/541 |
| 2013/0307671 A1* | 11/2013 | Hino | G06K 7/10366 |
| | | | 340/6.1 |
| 2016/0189498 A1* | 6/2016 | Sharma | G08B 25/08 |
| | | | 340/542 |
| 2017/0225790 A1* | 8/2017 | Ball | B63C 9/22 |
| 2019/0057598 A1 | 2/2019 | Martinez-Barreiro | |
| 2019/0077559 A1* | 3/2019 | Lumsden | B65D 55/026 |
| 2019/0225341 A1* | 7/2019 | Flinn | B64D 11/0631 |
| 2020/0070772 A1* | 3/2020 | Kim | B60Q 9/00 |

FOREIGN PATENT DOCUMENTS

| | | |
|---|---|---|
| EP | 3 098 163 A1 | 11/2016 |
| WO | 2020/002907 A1 | 1/2020 |

* cited by examiner

LIFE VEST CONTAINER DEVICE

PRIOR ART

The invention relates to a life vest container device according to the preamble of patent claim 1. A life vest container device for a life vest unit, with a life vest container comprising an accommodation unit that has an accommodation space as well as an access opening to the accommodation space, and with a monitoring device, has already been proposed.

The objective of the invention is, in particular, to provide a life vest container device with improved properties regarding a simple safety check. According to the invention, the objective is achieved by the features of patent claim 1, while advantageous embodiments and developments of the invention may be gathered from the dependent claims.

SUMMARY OF THE INVENTION

The invention relates to a life vest container device, in particular aircraft seat life vest container device, for a life vest unit, with a life vest container comprising an accommodation unit that has an accommodation space as well as an access opening to the accommodation space, and with a monitoring device.

It is proposed that the monitoring device is at least configured to capture a change of at least one characteristic via at least one electric and/or electronic signal. By means of the invention, improved properties regarding a simple safety check of the life vest container device can be achieved. By means of the invention, a safety check of the life vest container device can be done location-independent and time-independent. Moreover, the invention allows an advantageously quick safety check of the life vest container device, in particular of multiple life vest container devices. As a result, the invention allows a reduced work-load for cabin crew or security staff or technical staff, who has to regularly check the life vest container device, in particular before a departure of an aircraft. Thus, pre-flight preparation time of the cabin crew can be saved advantageously. Moreover, a faulty life vest container device can be detected quickly, independently from a manual safety check. As a result, a delay of a flight due to an unforeseen replacement of the life vest container device can be advantageously avoided.

Preferably, the life vest container device is configured for a fixation on an aircraft seat. The term "configured" is in particular to mean specifically designed and/or equipped. An object being configured for a certain function is in particular to mean that the object implements and/or carries out said certain function in at least one application state and/or operation state.

Preferably, the life vest container device comprises at least one fixation unit. Preferentially, the at least one fixation unit is configured for a, in particular stationary, fixation of the life vest container on the aircraft seat. Preferably, the life vest container is embodied as a, in particular flexible, bag or as a, in particular rigid, box. Preferentially, the accommodation unit is made of a plastic material, which is in particular embodied as a foil and/or a textile or a die cast component. Preferably, the accommodation unit encompasses the accommodation space. Preferably, the access opening is configured in such a way that it can be opened non-destructively repeatable or destructively unrepeatable. Preferentially, the access opening is closeable by at least one sealing unit of the life vest container.

Preferably, the monitoring device is at least configured to monitor the life vest container with regard to conformity with the at least one characteristic, in particular during an operation of the aircraft. Advantageously, the at least one characteristic comprises at least one state, in particular of the life vest container device. Preferentially, the at least one state has at least one state value. Preferably, the at least one state value is embodied as "0" or "1" or as "false" or "true". Preferentially, the at least one characteristic has one predetermined state value. In this context the term "predetermined state value" is in particular to mean a value that fulfills at least one requirement of a certification regulation for an operation of the life vest container device, in particular of the life vest container. In this context the term "change of at least one characteristic" is in particular to mean a change of the at least one state, wherein in particular the at least one state value deviates from a previous state value and/or the predetermined state value. The term "electric signal" is in particular to mean a signal that is embodied as electric energy. The term "electronic signal" is in particular to mean a signal that is configured for data communication.

In a preferred embodiment of the invention it is proposed that the life vest container device comprises a life vest unit that is configured to be arranged in the accommodation space. As a result, a safe accommodation of the life vest unit can be provided. Moreover, as a result, the life vest is advantageously monitorable. Preferably, the life vest unit features a life vest. Preferentially, the life vest is provided for an emergency situation, in which there is a danger of drowning. Advantageously, the life vest is configured to be worn by a person, in particular by a passenger or by a crew member, in the emergency situation. Preferably, the life vest is embodied inflatable. Alternatively, it is conceivable that the life vest is embodied as a solid life vest, which is in particular not inflatable. Preferably, the access opening is configured to insert the life vest unit into the accommodation space. Preferably, the access opening is configured to remove the life vest unit out of the accommodation space, in particular in the emergency situation. Preferentially, the at least one sealing unit is configured for closing the access opening when the life vest unit is arranged inside the accommodation space. It is conceivable that the life vest unit features a protective cover. Preferably, the protective cover is configured for a, in particular airtight, sealing of the life vest. Preferentially, the protective cover is configured to be detached from the life vest when using the life vest unit, in particular in the emergency situation.

In a further embodiment of the invention it is proposed that the monitoring device is at least configured to capture, via at least one electric and/or electronic signal, a manipulation of the life vest container, a removal of the life vest unit out of its correct stowage position, in which it is arranged in the accommodation space, and/or a presence of at least one foreign body in the accommodation space. As a result, a damage of the life vest container and/or the at least one sealing unit can be advantageously identified. Further, as a result, an availability of the life vest unit within the life vest container can be advantageously detected. Moreover, as a result, an improper use of the life vest container can be advantageously discovered. Thus, a failure of the life vest container and/or the life vest unit can be advantageously avoided in the emergency situation. The term "manipulation" is in particular to mean that a condition of the life vest container gets changed subsequently to a, in particular intentional, contact of a person, in particular of a passenger, with the life vest container. For instance, the life vest container may be damaged subsequently to the manipulation. Preferably, as a result of the manipulation, the at least one characteristic, in particular the at least one state, is changed. Preferentially, in the correct stowage position of the life vest unit, the life vest unit is arranged completely inside the accommodation space. Advantageously, in the correct stowage position, solely the life vest unit is present in the accommodation space. It is conceivable, that the at least one foreign body, for instance, is embodied as a pen, a passport, a wallet, a mobile phone, a piece of trash or used chewing gum. It is conceivable that the at least one foreign body may damage the life vest container and/or the life vest unit, which could lead to a malfunction of the life vest container and/or the life vest unit.

In an alternative embodiment of the invention it is proposed that the monitoring device comprises at least one electric and/or electronic sensor unit, which is at least configured for a sensing of a weight and/or a volume, in particular depending on at least one time characteristic. As a result, a presence of the life vest unit in the life vest container can be advantageously detected. Moreover, the presence of the at least one foreign body in the life vest container can be advantageously detected. Preferably, the at least one electric and/or electronic sensor unit features at least one weight sensor and/or at least one volume sensor. Preferably, the at least one weight sensor is configured for measuring a weight of the life vest container, in particular with the life vest unit arranged in the accommodation space. Advantageously, the at least one weight sensor is embodied as a piezoelectric element. Alternatively, the at least one weight sensor is embodied as an electromechanical weight sensor with a mechanically preset target value for a predetermined and set weight, wherein the electromechanical weight sensor has multiple sensing layers, which are configured to induce an electric signal if an actual weight deviates from the set weight. Preferentially, the at least one weight sensor is configured for determining a presence of the life vest unit and/or of the at least one foreign body inside the life vest container, in particular in the accommodation space. Advantageously, the at least one weight sensor is continuously in operation for measuring a weight. Preferably, the at least one volume sensor is configured for measuring a volume of the life vest container, in particular with the life vest unit arranged in the accommodation space.

Advantageously, the at least one volume sensor is continuously in operation for measuring a volume. Preferentially, the volume sensor is configured for determining the presence of the life vest unit inside the life vest container and/or the presence of the at least one foreign body in the accommodation space. Advantageously, the at least one time characteristic is embodied as a measuring period. Preferentially, the measuring period is in particular at least 10 seconds, preferably at least 30 seconds and advantageously at least 60 seconds. Advantageously, the measuring period is provided to determine an average measuring value, in particular to compensate for variation of a plurality of measuring values. As a result, short-term deviations due to change of position of the aircraft or accelerations acting on the life vest container can be advantageously masked out. Additionally or alternatively, it is conceivable that the at least one state is changed by exceeding at least one, in particular predetermined, marginal value for a set weight and/or a set volume.

In another embodiment of the invention it is proposed that the monitoring device comprises the at least one electric and/or electronic sensor unit, which is at least partly arranged on the life vest container and/or on the accommodation unit. As a result, a tightly arranged life vest container device can be provided. Further, as a result, the life vest unit is advantageously monitorable. Preferentially, the at least one electric and/or electronic sensor unit is at least partly arranged on a surface of the life vest container and/or on a surface of the accommodation unit and/or inside the accommodation unit. Preferably, the at least one electric and/or electronic sensor unit is configured to determine the at least one state value, in particular to determine whether there is a change of the at least one characteristic.

In a preferred embodiment of the invention it is proposed that the at least one electric and/or electronic sensor unit comprises at least one electric coupling unit, which is configured to close or open an electric circuit if the life vest unit is moved out of its stowage position in the accommodation space. As a result, a presence of the life vest unit in the life vest container can be advantageously detected. Moreover, as a result, a complex electronic processing is advantageously avoidable. Preferentially, the at least one electric coupling unit is configured to actuate the electric circuit if the life vest unit is moved out of its stowage position in the accommodation space. Preferably, the at least one electric coupling unit is at least partly arranged on the life vest container and/or on the accommodation unit. Preferentially, the at least one electric coupling unit is at least partly arranged inside the accommodation unit. Advantageously, the at least one electric and/or electronic sensor unit is coupled with the life vest unit at least in the stowing position. Preferably, the at least one electric coupling unit is configured to trigger at least one electric signal. Preferentially, the at least one electric signal is configured for a change of the at least one state value of the at least one state. Preferentially, the at least one electric coupling unit features at least one connector element. Preferably, the at least one connector element is configured for a frictional engaged connection and/or for a form-fit connection. Preferentially, the at least one connector element is connected with the accommodation unit. Preferably, the at least one electric coupling unit features at least one corresponding connector element. Preferentially, the at least one corresponding connector element is connected with the life vest unit, in particular with the protective cover or the life vest. Advantageously, the at least one corresponding connector element is configured for a connection with the at least one connector element. Advantageously, the at least one connector element and the at least one corresponding connector element are configured to get separated from each other if the life vest unit is moved out of its stowage position. Preferably, the at least one connector element and the at least one corresponding connector element are configured to close or open the electric circuit if the at least one connector element and the at least one corresponding connector element are separated from each other.

In a further embodiment of the invention it is proposed that the at least one electric and/or electronic sensor unit comprises at least one detection element, which is fixedly connected with the life vest container. As a result, a presence of the life vest unit in the life vest container and/or a presence of the at least one foreign body in the life vest container can be advantageously detected. Preferably, the at least one detection element is embodied as an electromagnetic coil, as an electric wiring and/or as an inductive switch. Preferentially, the life vest unit and/or the at least one sealing unit comprises at least one magnetic element, which is configured to change a position of a magnetic field during a movement. Advantageously, the detection element is configured to sense an induction subsequently to a change of the magnetic field based on the at least one magnetic element.

Preferably, the accommodation unit is embodied as a smart textile. The term "smart textile" is in particular to mean a material, in particular a fabric-enforced material, that is configured to detect a change of the at least one characteristic, wherein the at least one electric and/or electronic sensor unit is at least partly integrated into the material and/or at least partly applied onto the material. Preferably, the electric wiring is integrated in the life vest container, in particular in a wall of the accommodation unit, and/or applied onto the life vest container, in particular on the wall of the accommodation unit.

In an alternative embodiment of the invention it is proposed that the at least one electric and/or electronic sensor unit comprises at least one optical sensor. As a result, a manipulation of the life vest container, in particular of the access opening, can be advantageously identified. As a result, a presence of the life vest unit in the life vest container and/or a presence of the at least one foreign body in the life vest container can be advantageously detected. Preferentially, the optical sensor is configured to detect a presence of the life vest unit, a presence of the at least one foreign body and/or a state of the access opening. Preferably, the at least one optical sensor is embodied as an image sensor, as a photodiode and/or as an infrared sensor. Advantageously, the image sensor is configured to detect a presence of the life vest unit, a presence of the at least one foreign body and/or the state of the access opening. Preferentially, the photodiode is configured to detect a presence of the life vest unit, a presence of the at least one foreign body and/or the state of the access opening. Preferably, the at least one electric and/or electronic sensor unit features at least one infrared emitter element, in particular an infrared diode, which is configured to emit an infrared beam. Preferentially, the infrared sensor is configured to detect the infrared beam. Preferably, the at least one electric and/or electronic sensor unit embodies at least one photo-electric guard. Advantageously, the photo-electric guard is provided by the infrared emitter element and the infrared sensor. Preferentially, the at least one photo-electric guard is configured to monitor the access opening. Preferably, the at least one photo-electric guard is configured to detect a movement of the life vest unit out of its stowage position and/or a movement of the at least one foreign body into the accommodation space. Preferably, the at least one optical sensor is arranged in the life vest container and/or in the accommodation unit. Preferentially, the at least one optical sensor is arranged inside the accommodation space.

In another embodiment of the invention it is proposed that the monitoring device comprises at least one control and/or regulation unit, which is configured to capture the electric and/or electronic signal and to send an output signal to a checking system. As a result, an advantageously automated data processing can be provided. As a result, a fully automated safety check of the life vest container device can be advantageously realized. The term "control and/or regulating unit" is in particular to mean a unit having at least one control electronics member. The term "control electronics member" is in particular to mean a unit with a processor unit and with a memory unit and with an operating program stored in the memory unit. Preferably, the at least one control and/or regulation unit is connected to an electric power source of the aircraft. Preferentially, the at least one control and/or regulation unit is arranged on the aircraft seat. Alternatively or additionally, it is conceivable that the at least one control and/or regulation unit is arranged in a console of the aircraft seat, in an ottoman of the aircraft seat and/or in a shell element of the aircraft seat. It is conceivable that the at least one control and/or regulation unit, in particular the at least one control electronics member, is arranged inside the life vest container, wherein the at least one control and/or regulation unit, in particular the at least one control electronics member, is embodied independently from an electric energy source and features an integrated electric generator, which is configured for energy harvesting. It is conceivable that the at least one control and/or regulation unit is configured for a shared operation by multiple life vest container devices. For instance, the at least one control and/or regulation unit is provided for an aircraft seat bench with at least two aircraft seats, in particular with three aircraft seats, wherein each aircraft seat has an allocated life vest container device. Advantageously, data between the at least one electric and/or electronic sensor unit and the at least one control and/or regulation unit are/is transmitted by wire. Alternatively, it is conceivable that data between the at least one electric and/or electronic sensor unit and the at least one control and/or regulation unit are/is transmitted in wireless fashion, in particular by an optical data communication embodied, for instance, as Li-Fi (light fidelity). It is conceivable that the at least one control and/or regulation unit is also configured as part of an inflight entertainment module and/or as part of an aircraft seat adjustment module. Preferably, the at least one control and/or regulation unit is configured to determine, whether there is a change of the at least one characteristic, in particular a change of the at least one state. Preferentially, the output signal comprises at least one dataset, which features information about the at least one characteristic, in particular about the at least one state. Advantageously, the output signal differs from the electric and/or electronic signal captured by the monitoring device. The term "checking system" is in particular to mean a system, which is configured for receiving the output signal, for data interpretation and/or for presentation of a monitoring result. Preferentially, the monitoring result is embodied as an outcome of a safety check of the life vest container device. Preferably, the checking system is at least partly arranged in the aircraft. It is conceivable that the checking system is embodied as part of a maintenance, repair and/or overhaul system, wherein the output signal is provided for planning of a manual check and/or a replacement of the life vest device on the aircraft seat.

In a preferred embodiment of the invention it is proposed that the monitoring device comprises at least one output unit, which is configured to output at least one output signal. As a result, the monitoring result is advantageously presentable for a perception of a condition of the life vest container device. Preferentially, a plurality of life vest container devices according to the invention are monitorable, in particular by the cabin crew, by means of the at least one output unit. Preferably, the at least one output unit is embodied as a screen unit, which in particular is accessible by cabin crew or technical staff or security staff. Preferably, the screen unit is part of the checking system. Advantageously, the screen unit is embodied as a portable tablet computer or as a permanently installed screen. Preferentially, the permanently installed screen is arranged in an aircraft cabin of the aircraft. Preferably, the permanently installed screen is arranged on an aircraft seat, for instance as a passenger screen, which is in particular provided for an inflight entertainment system, or on a cabin wall, for instance on a cabin wall in a galley or on a cabin wall in a region of a door of the aircraft. Advantageously, the at least one screen unit presents the at least one output signal traffic-light-like, in particular with at least one color. Preferably, the at least one color is green, yellow or red. Preferably, the at least one output unit is configured to show if the life vest container device meets the predetermined state value of the at least one state. As a result, a change of the at least one characteristic is advantageously recognizable by means of the at least one output unit.

In a further embodiment of the invention it is proposed that the at least one output unit comprises at least one optical and/or acoustical element that is arranged in an aircraft seat region. As a result, the monitoring result is advantageously presentable for a perception of a condition of the life vest container device in a region near the life vest container device. Moreover, as a result, a theft of the life vest container device and/or the life vest unit can be prevented due to a deterrent optical and/or acoustical effect. Thereby, costs can be advantageously reduced, as less life vest units need to be substituted and less life vest units have to be provisioned on reserve. The term "aircraft seat region" is in particular to mean a region around the aircraft seat, wherein the region extents in particular maximum 1 m, preferably maximum 0.5 m and advantageously maximum 0.1 m beyond an outline of the aircraft seat relating to a cabin floor of the aircraft cabin. Preferably, the optical element is arranged on the aircraft seat or on a ceiling of the aircraft cabin, for instance in a passenger service unit. Advantageously, the optical element is configured for presenting the at least one output signal traffic-light-like. Preferably, the optical element is embodied as a light-emitting diode or as a light bulb. Additionally or alternatively, it is conceivable that the optical element is configured to produce a flashing light, in particular if the life vest container device deviates from the predetermined state value of the at least one state. It is conceivable that the optical element is embodied as a smart textile, which is in particular integrated into an outer fabric of the aircraft seat or in an outer surface of a shell element of the aircraft seat. Preferably, the acoustical element is embodied as a loudspeaker, which is configured to sound an alarm, in particular if the life vest container device deviates from the predetermined state value of the at least one state. It is conceivable that the optical and/or acoustical element is arranged on the life vest container device, in particular near the access opening. In principle, it is conceivable that the monitoring device is configured to trigger a combination of visual and acoustic outputs if the life vest container device deviates from the predetermined state value of the at least one state.

The invention further relates to an aircraft seat with the life vest container device according to the present invention. As a result, an advantageous aircraft seat with improved properties regarding a simple safety check of the life vest container device can be achieved. Preferentially, the aircraft seat is configured to be mounted in the aircraft cabin of the aircraft. Preferably, the aircraft seat features a seat bottom, which in particular provides a seating surface for a passenger. Preferentially, the life vest container device is configured to be arranged on the aircraft seat. Preferably, the life vest container device, in a mounted state, is fixated on the aircraft seat, in particular by means of the at least one fixation unit. Advantageously, in a mounted state, the life vest container is arranged between a cabin floor of the aircraft cabin and the seat bottom of the aircraft seat. Preferentially, in the mounted state, the life vest container is arranged hanging underneath the seat bottom of the aircraft seat by means of the at least one fixation unit. In principle, it is conceivable that the life vest container device is arranged in another region of the aircraft seat, which, in particular, is easily accessible by a passenger. Preferably, the at least one electric and/or electronic sensor unit and/or the at least one control and/or regulation unit are/is at least partly arranged on the aircraft seat.

The invention further relates to a method of monitoring the life vest container device, in particular the aircraft seat life vest container device, comprising the life vest unit and the life vest container with the accommodation unit that defines the accommodation space for the life vest unit and the access opening to the accommodation space, wherein the method comprises monitoring at least one of the life vest unit and the life vest container and capturing a change of at least one characteristic of the life vest unit and/or the life vest container via at least one electric and/or electronic signal. Preferably, the method further comprises monitoring for a change in at least one characteristic of the life vest unit and/or the life vest container, in particular by means of the monitoring device. Preferentially, the method further comprises capturing the change in the at least one characteristic of the life vest unit and/or the life vest container when the change in the at least one characteristic occurs during monitoring for the change in the at least one characteristic. Preferably, the method is provided for an operation of the life vest container device according to the present invention, wherein a manipulation of the life vest unit and/or of the life vest container is captured via an electric and/or electronic signal. As a result, a simple and quick safety check of the life vest container device can be provided. As a result, an advantageously automated safety check of the life vest container device is achieved. Preferably, in at least one method step, the life vest container device gets checked by means of the monitoring device. Preferentially, the at least one characteristic is monitored in the at least one method step. Advantageously, the change of the at least one characteristic, in particular due to a manipulation, is detected in the at least one method step via at least one electric and/or electronic signal. Preferably, in the at least one method step, the at least one state of the life vest container device is monitored. Preferentially, in the at least one method step, the at least one control and/or regulation unit captures the electric and/or electronic signal from the at least one electric and/or electronic sensor unit. Preferably, the at least one control and/or regulation unit sends an output signal to the checking system and/or to the at least one output unit. Preferably, in at least one further method step, the at least one output unit outputs the at least one output signal visually and/or acoustically, in particular to the cabin crew. Advantageously, in the at least one further method step, if the life vest container device deviates from the predetermined state value of the at least one state, the at least one output signal will change. Preferably, subsequently to the at least one further method step, the at least one method step gets repeated. Advantageously, the method is automatically repeated in particular at least every 60 seconds, preferably at least every 10 seconds and advantageously at least every 1 second. It is conceivable that the method can also contain intermediate method steps and/or further method steps which are not part of the invention.

It is not intended to restrict the life vest container device, the aircraft seat and the method according to the invention to the use and embodiment described above. The content of this disclosure is intended to contain all conceivable combinations of the features mentioned herein. In particular, the life vest container device, the aircraft seat and the method according to the invention can have a number of individual elements, components and units different from that mentioned herein in order to perform a function described herein. Furthermore, regarding the value ranges mentioned in this disclosure, values within the limits mentioned are to be understood to be also disclosed and to be used as applicable.

DRAWINGS

Further advantages may become apparent from the following description of the drawings. In the drawings four exemplary embodiments of the invention are shown. The drawings, the description and the claims contain a plurality of features in combination. The person having ordinary skill in the art will purposefully also consider the features separately and will find further expedient combinations.

If there is more than one specimen of a certain object, at least in some cases only one of these is given a reference numeral in the figures and the description. The description of this specimen may be correspondingly transferred to the other specimens of the object.

It is shown in.

DESCRIPTION OF THE ILLUSTRATIVE EMBODIMENTS

Figure 1:
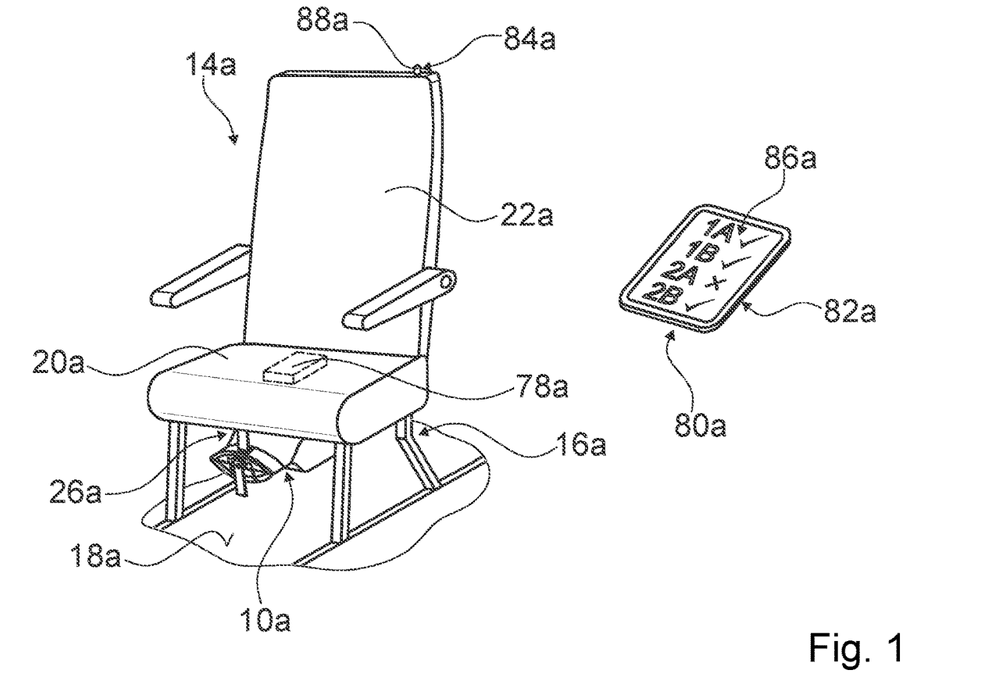
FIG. 1 a life vest container device according to the invention for a life vest unit and an aircraft seat in a schematic perspective view of a first embodiment of the invention, FIG. 2 the life vest container device according to the invention in a schematic perspective view of the first embodiment of the invention, FIG. 3 the life vest container device according to the invention in a sectional side view of the first embodiment of the invention, FIG. 4 a method for an operation of the life vest container device according to the invention in a schematic view of the first embodiment of the invention, FIG. 5 a life vest container device according to the invention in a schematic perspective view of a second embodiment of the invention, FIG. 6 the life vest container device according to the invention in a sectional side view of the second embodiment of the invention, FIG. 7 a life vest container device according to the invention in a schematic perspective view of a third embodiment of the invention, FIG. 8 the life vest container device according to the invention in a sectional side view of the third embodiment of the invention, FIG. 9 a life vest container device according to the invention in a schematic perspective view of a fourth embodiment of the invention and FIG. 10 the life vest container device according to the invention in a sectional side view of the fourth embodiment of the invention.

FIG. 1 shows a life vest container device 10a for a life vest unit 12a and an aircraft seat 14a in a schematic perspective view. The aircraft seat 14a is configured to be mounted in an aircraft cabin of the aircraft (not shown). The aircraft seat 14a features a mounting unit 16a. The mounting unit 16a is configured for mounting the aircraft seat 14a on a cabin floor 18a of the aircraft cabin. The aircraft seat 14a features a seat bottom 20a. The aircraft seat 14a features a backrest 22a. The seat bottom 20a and the backrest 22a are arranged at the mounting unit 16a.

The aircraft seat 14a comprises the life vest container device 10a. The life vest container device 10a is embodied as an aircraft seat life vest container device. The life vest container device 10a is configured to be arranged on the aircraft seat 14a. The life vest container device 10a is configured for a fixation on the aircraft seat 14a.

Figure 2:
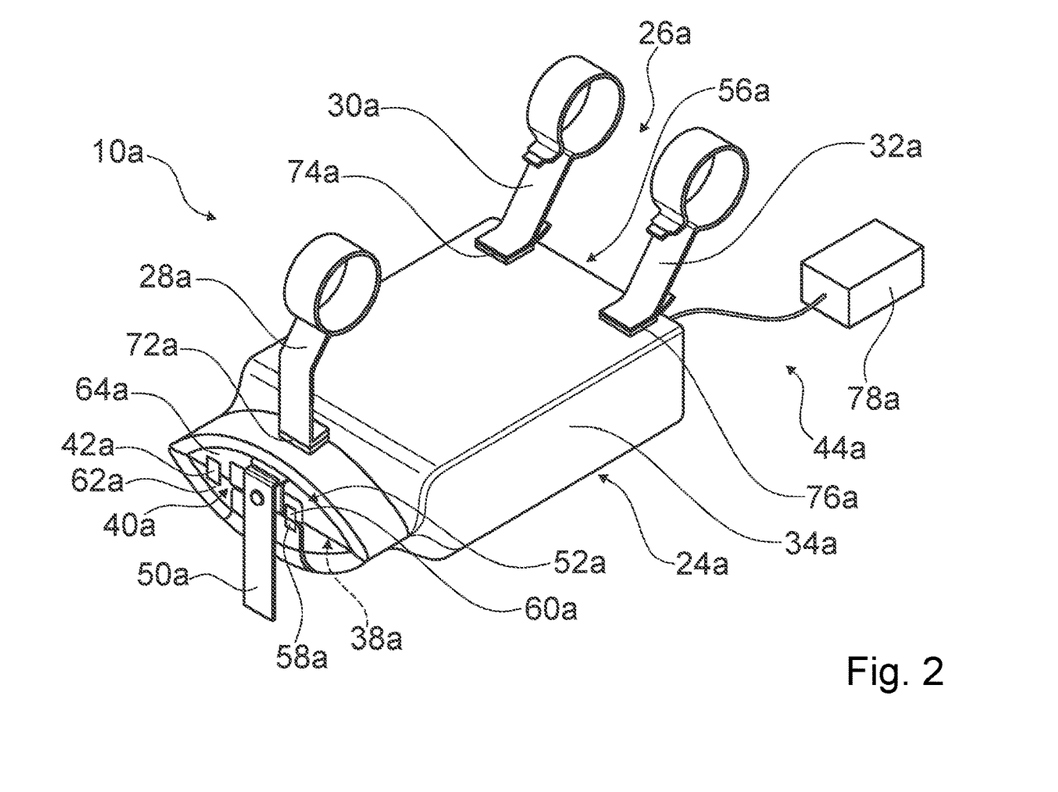

FIG. 2 shows the life vest container device 10a in a schematic perspective view. The life vest container device 10a features a life vest container 24a. The life vest container 24a is embodied as a flexible bag. Alternatively, it is conceivable that the life vest container 24a is embodied as a rigid box. In a mounted state, the life vest container 24a is arranged between the cabin floor 18a of the aircraft cabin and the seat bottom 20a of the aircraft seat 14a. In principle, it is conceivable that the life vest container device 10a is arranged in another region of the aircraft seat 14a, which is easily accessible by a passenger.

The life vest container device 10a comprises a fixation unit 26a. The fixation unit 26a is configured for a stationarily fixation of the life vest container 24a on the aircraft seat 14a. In the mounted state, the life vest container 24a is arranged hanging underneath the seat bottom 20a of the aircraft seat 14a by means of the fixation unit 26a (cf. FIG. 1). The life vest container device 10a, in the mounted state, is fixated on the aircraft seat 14a by means of the fixation unit 26a. The fixation unit 26a comprises three fixation elements 28a, 30a, 32a. The fixation elements 28a, 30a, 32a each are partly embodied as a clip. The fixation elements 28a, 30a 32a are partly configured to encompass cross tubes (not shown) of the mounting unit 16a. The fixation elements 28a, 30a, 32a are connected with the life vest container 24a.

The life vest container 24a comprises an accommodation unit 34a. The accommodation unit 34a has an accommodation space 36a as well as an access opening 38a to the accommodation space 36a. The accommodation unit 34a is made of a plastic material, which is embodied as a foil and/or as a textile. The accommodation unit 34a encompasses the accommodation space 36a. The access opening 38a is configured in such a way that it can be opened non-destructively repeatable. The life vest container 24a features a sealing unit 40a. The sealing unit 40a is configured for sealing the access opening 38a. The access opening 38a is closeable by the sealing unit 40a of the life vest container 24a. The sealing unit 40a features a seal element 42a which is configured to break by opening of the access opening 38a. The seal element 42a is embodied as a sticker.

Figure 3:
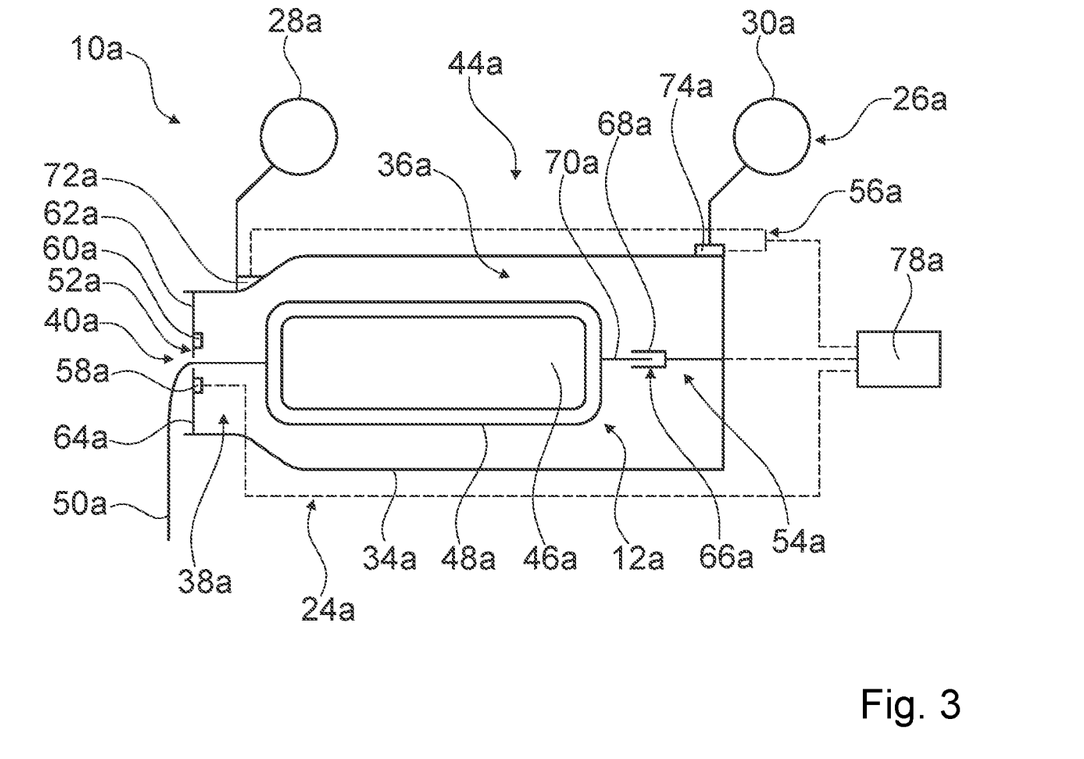

The life vest container device 10a features a monitoring device 44a. The monitoring device 44a is at least configured to capture a change of at least one characteristic via at least one electric and/or electronic signal. The monitoring device 44a is at least configured to monitor the life vest container 24a with regard to conformity with characteristics during an operation of the aircraft. The monitoring device 44a is at least configured to capture, via the at least one electric and/or electronic signal, a manipulation of the life vest container 24a, a removal of the life vest unit 12a out of its correct stowage position, in which it is arranged in the accommodation space 36a, and a presence of at least one foreign body (not shown) in the accommodation space 38a. The correct stowage position is shown in FIG. 3. The characteristics each comprise two states with two state values.

A first characteristic is related to the access opening 38a. The first characteristic comprises a first state and a second state. The first state of the first characteristic is "sealing unit 40a closed". The first state of the first characteristic has one state value that is embodied as "false". The second state of the first characteristic is "sealing unit 40a opened". The second state of the first characteristic has one state value that is embodied as "true". The first characteristic has one predetermined state value that is embodied as "false".

A second characteristic is related to the life vest unit 12a. The second characteristic comprises a first state and a second state. The first state of the second characteristic is "life vest unit 12a present in the accommodation space 36a". The first state of the second characteristic has one state value that is embodied as "false". The second state of the second characteristic is "life vest unit 12a not present in the accommodation space 36a". The second state of the second characteristic has one state value that is embodied as "true". The second characteristic has one predetermined state value that is embodied as "false".

A third characteristic is related to the at least one foreign body. The third characteristic comprises a first state and a second state. The first state of the third characteristic is "foreign body not present in the accommodation space 36a". The first state of the third characteristic has one state value that is embodied as "false". The second state of the third characteristic is "foreign body present in the accommodation space 36a". The second state of the third characteristic has one state value that is embodied as "true". The third characteristic has one predetermined state value that is embodied as "false".

FIG. 3 shows the life vest container device 10a in a sectional side view. The life vest container device 10a comprises the life vest unit 12a. The life vest unit 12a is configured to be arranged in the accommodation space 36a. The life vest unit 12a features a life vest 46a. The life vest 46a is provided for an emergency situation, wherein there is a danger of drowning. The life vest 46a is configured to be worn by a passenger or by a crew member in the emergency situation. The life vest 46a is embodied inflatable. The access opening 38a is configured to insert the life vest unit 12a into the accommodation space 36a. The access opening 38a is configured to remove the life vest unit 12a out of the accommodation space 36a, in particular in the emergency situation. The sealing unit 40a is configured for closing the access opening 38a when the life vest unit 12a is arranged inside the accommodation space 36a. The life vest unit 12a features a protective cover 48a. The protective cover 48a is configured for an airtight sealing of the life vest 46a. The protective cover 48a is configured to be detached from the life vest 46a when using the life vest unit 12a, in particular in the emergency situation. The life vest unit 12a features a pull strap 50a. The pull strap 50a is provided as a handle for a passenger for receiving the life vest unit 12a from the life vest container 24a. The pull strap 50a is connected with the protective cover 48a. In the correct stowage position of the life vest unit 12a, the life vest unit 12a is arranged completely inside the accommodation space 36a. In the correct stowage position, solely the life vest unit 12a is present in the accommodation space 36a.

The monitoring device 44a comprises three electric and/or electronic sensor units 52a, 54a, 56a.

A first electric and/or electronic sensor unit 52a is at least configured for a detection of a manipulation of the sealing unit 40a. The first electric and/or electronic sensor unit 52a is arranged on the aircraft seat 14a. The first electric and/or electronic sensor unit 52a is at least partly arranged on the life vest container 24a and on the accommodation unit 34a. The first electric and/or electronic sensor unit 52a is at least partly arranged on the sealing unit 40a. The first electric and/or electronic sensor unit 52a is configured to determine a change of the first characteristic. The first electric and/or electronic sensor unit 52a comprises a detection element 58a. The detection element 58a is fixedly connected with the life vest container 24a. The detection element 58a is fixedly connected with the sealing unit 40a. The detection element 58a is embodied as an inductive switch. The detection element 58a is configured to create and/or to modify the at least one electric and/or electronic signal. The sealing unit 40a comprises a magnetic element 60a, which is configured to change a position of a magnetic field during a movement. The detection element 58a is configured to sense an induction subsequently to a change of the magnetic field based on the magnetic element 60a. The sealing unit 40a features a flap 62a and a further flap 64a, which are configured to block the access opening 38a. The pull strap 50a reaches between the flap 62a and the further flap 64a. The detection element 58a is arranged on the further flap 64a. The magnetic element 60a is arranged on the flap 62a.

A second electric and/or electronic sensor unit 54a is at least configured for a detection of a presence of the life vest unit 12a inside the accommodation unit 34a. The second electric and/or electronic sensor unit 54a is arranged on the aircraft seat 14a. The second electric and/or electronic sensor unit 54a is at least partly arranged on the life vest container 24a and on the accommodation unit 34a. The second electric and/or electronic sensor unit 54a is at least partly arranged inside the accommodation unit 34a. The second electric and/or electronic sensor unit 54a is configured to determine a change of the second characteristic. The second electric and/or electronic sensor unit 54a comprises an electric coupling unit 66a. The electric coupling unit 66a is configured to open an electric circuit if the life vest unit 12a is moved out of its stowage position in the accommodation space 36a. The electric coupling unit 66a is at least partly arranged on the life vest container 24a and on the accommodation unit 34a. The electric coupling unit 66a is at least partly arranged inside the accommodation unit 34a. The second electric and/or electronic sensor unit 54a is coupled with the life vest unit 12a at least in the stowing position. The electric coupling unit 66a is configured to trigger at least one electric signal. The electric coupling unit 66a is configured to create and/or to modify the at least one electric signal. The at least one electric signal is configured for a change of state value for the second characteristic. The electric coupling unit 66a features a connector element 68a. The connector element 68a is configured for a frictional engaged connection and/or for a form-fit connection. The connector element 68a is connected with the accommodation unit 34a. The electric coupling unit 66a features a corresponding connector element 70a. The corresponding connector element 70a is connected with the life vest unit 12a. The corresponding connector element 70a is connected with the protective cover 48a. The corresponding connector element 70a is configured for a connection with the connector element 68a. The connector element 68a and the corresponding connector element 70a are configured for an electrical connection with each other. The connector element 68a and the corresponding connector element 70a are configured to get separated from each other if the life vest unit 12a is moved out of its stowage position. The connector element 68a and the corresponding connector element 70a are configured to open the electric circuit if the connector element 68a and the corresponding connector element 70a are separated from each other. The second electric and/or electronic sensor unit 54a is partly embodied as a rope pull switch.

A third electric and/or electronic sensor unit 56a is at least configured for a sensing of a weight depending on a time characteristic. The third electric and/or electronic sensor unit 56a is arranged on the aircraft seat 14a. The third electric and/or electronic sensor unit 56a is at least partly arranged on the life vest container 24a and on the accommodation unit 34a. The third electric and/or electronic sensor unit 56a is at least partly arranged on a surface of the life vest container 24a and on a surface of the accommodation unit 34a. The third electric and/or electronic sensor unit 56a is configured to determine a change of the third characteristic. The third electric and/or electronic sensor unit 56a features three weight sensors 72a, 74a, 76a. The weight sensor 72a is arranged between the fixation element 28a and the life vest container 24a. The weight sensor 74a is arranged between the fixation element 30a and the life vest container 24a. The weight sensor 76a is arranged between the fixation element 32a and the life vest container 24a. The weight sensors 72a, 74a, 76a are configured for measuring a weight of the life vest container 24a with the life vest unit 12a arranged in the accommodation space 36a. The weight sensors 72a, 74a, 76a each are embodied as a piezoelectric element. The weight sensors 72a, 74a, 76a each are configured to create and/or to modify the at least one electric and/or electronic signal. The weight sensors 72a, 74a, 76a are configured for determining a presence of at least one foreign body inside the life vest container 24a. The weight sensors 72a, 74a, 76a are configured for determining a presence of the at least one foreign body inside the accommodation space 36a. Additionally or alternatively, it is conceivable that the weight sensors 72a, 74a, 76a are configured for determining a presence of the life vest unit 12a inside the life vest container 24a. The time characteristic is embodied as a measuring period. The measuring period is at least 30 seconds. The measuring period is provided to determine an average measuring value to compensate for variation of a plurality of measuring values. The measuring period is provided for masking out short-term deviations due to change of position of the aircraft or accelerations acting on the life vest container 24a. A change of the first state to the second state of the third characteristic will occur by exceeding at least one predetermined marginal value for a set weight.

If an electric and/or electronic sensor unit 52a, 54a, 56a is not able to send an electric and/or electronic signal, the state value is set equal to a contrary of the predetermined state value respectively. As a result, a situation with a power-off and/or a fault within an electric and/or electronic sensor unit 52a, 54a, 56a can be advantageously made safe.

The monitoring device 44a comprises a control and/or regulation unit 78a. The control and/or regulation unit 78a is at least partly arranged on the aircraft seat 14a. The control and/or regulation unit 78a is arranged underneath the seat bottom 20a of the aircraft seat 14a. The control and/or regulation unit 78a is connected to the mounting unit 16a. Furthermore, it is conceivable that the control and/or regulation unit 78a is configured for a shared operation by multiple life vest container devices 10a, wherein the control and/or regulation unit 78a is provided for an aircraft seat bench with at least one further aircraft seat (not shown), wherein the control and/or regulation unit 78a may be arranged in another region of the aircraft seat 10a or on the at least one further aircraft seat. Alternatively, it is conceivable that the control and/or regulation unit 78a is arranged inside the life vest container 24a. The control and/or regulation unit 78a is configured to capture an electric and/or electronic signal and to send an output signal to a checking system 80a (cf. FIG. 1). The first electric and/or electronic sensor unit 52a is configured to send at least one electric and/or electronic signal to the control and/or regulation unit 78a. The second electric and/or electronic sensor unit 54a is configured to send at least one electric and/or electronic signal to the control and/or regulation unit 78a. The third electric and/or electronic sensor unit 56a is configured to send at least one electric and/or electronic signal to the control and/or regulation unit 78a.

It is conceivable that the control and/or regulation unit 78a is also configured as a part of an inflight entertainment module and/or as a part of an aircraft seat adjustment module. The control and/or regulation unit 78a is configured to determine, whether there is a change of at least one of the three characteristics. The output signal comprises a dataset, which features information about the three characteristics. Additionally, the dataset features information about the date of a correct installation of the life vest unit 12a in the accommodation space 36a. As a result, a date of a scheduled replacement and/or a manual inspection of the life vest unit 12a can be viewed advantageously. Additionally, the dataset features information regarding a possible removal of the life vest unit 12a from the accommodation space 36a as well as a subsequent, correct or incorrect, re-insertion in the accommodation space 36a. The checking system 80a is configured for receiving the output signal, for data interpretation and for presentation of a monitoring result. The monitoring result is embodied as an outcome of a safety check of the life vest container device 10a. The checking system 80a is at least partly arranged in the aircraft. It is conceivable that the checking system 80a is embodied as part of a maintenance, repair and/or overhaul system, wherein the output signal is provided for planning of a manual check and/or a replacement of the life vest device 10a on the aircraft seat 14a.

The monitoring device 44a comprises two output units 82a, 84a (cf. FIG. 1). The output units 82a, 84a each are configured to output the output signal. A plurality of life vest container devices 10a are monitorable by means of the output units 82a, 84a.

A first output unit 82a is embodied as a screen unit. The screen unit is accessible by a cabin crew of the aircraft. The screen unit is part of the checking system 80a. The screen unit is embodied as a portable tablet computer. Additionally or alternatively it is conceivable that the screen unit is embodied as a permanently installed screen, which is arranged in the aircraft cabin of the aircraft. The permanently installed screen is arranged on the aircraft seat 14a, for instance as a passenger screen, which is provided for an inflight entertainment system, or on a cabin wall, for instance on a cabin wall in a galley or on a cabin wall in a region of a door of the aircraft. The first output unit 82a is configured to show if the life vest container device 10a meets the predetermined state value of the determined states. The screen unit presents the output signal as a symbol relating to specific aircraft seats 14a. The symbol is embodied as a check mark or as a cross. The check mark appears if all determined state values correspond to the predetermined state value. In the present case the check mark appears if all state values are "false". The cross appears if at least one of the determined state values of the three characteristics does not correspond to the predetermined state values. In the present case the cross appears if at least one state value is "true".

The first output unit 82a shows a listing 86a of all aircraft seats 14a which are arranged in the aircraft cabin (cf. FIG. 1). For clarity, only four aircraft seats 14a are listed in the listing 86a. The aircraft cabin comprises a first row with aircraft seats 14a with seat numbers "1A" and "1B" (not shown). The aircraft cabin comprises a second row with aircraft seats 14a with seat numbers "2A" and "2B" (not shown). As shown on the first output unit 82a the aircraft seats 14a with seat numbers "1A", "1B" and "2B" have a successful safety check regarding the life vest container device 10a. The aircraft seat 14a with seat number "2A" has a not successful safety check regarding the life vest container device 10a. A manual check of the life vest container device 10a of the aircraft seat 14a with seat number "2A" has to be performed. It is conceivable that further information about the safety check can be retrieved by the output unit 82a, for instance which characteristic has changed compared to the required condition. Additionally, it is conceivable that individual passenger information can be retrieved via the first output unit 82a, for instance food and/or beverage preferences, frequent flyer status and/or nationality. In principle, the way of representing the output signal may differ from the shown embodiment. For instance, the aircraft seats 14a may be displayed in a top view of the aircraft cabin instead of the listing 86a.

A second output unit 84a comprises an optical and acoustical element 88a that is arranged in an aircraft seat region (cf. FIG. 1). The second output unit 84a is configured to create a combination of visual and acoustic outputs if the life vest container device 10a deviates from a predetermined condition. The optical and acoustical element 88a is arranged on the aircraft seat 14a. The optical element 88a is configured for presenting the output signal traffic-light-like. The optical element 88a presents the output signal traffic-light-like with three colors. The colors are green, yellow and red. The output unit is configured to show if the life vest container device meets the predetermined state value of the at least one state. The optical element 88a is embodied as a light-emitting diode. Additionally, it is conceivable that the optical element 88a is configured to produce a flashing light if the life vest container device 10a deviates from a predetermined condition. It is conceivable that the optical element 88a is embodied as a smart textile, which is integrated into an outer fabric of the aircraft seat 14a. The acoustical element 88a is embodied as a loudspeaker, which is configured to sound an alarm if the life vest container device 10a deviates from the predetermined condition.

Figure 4:
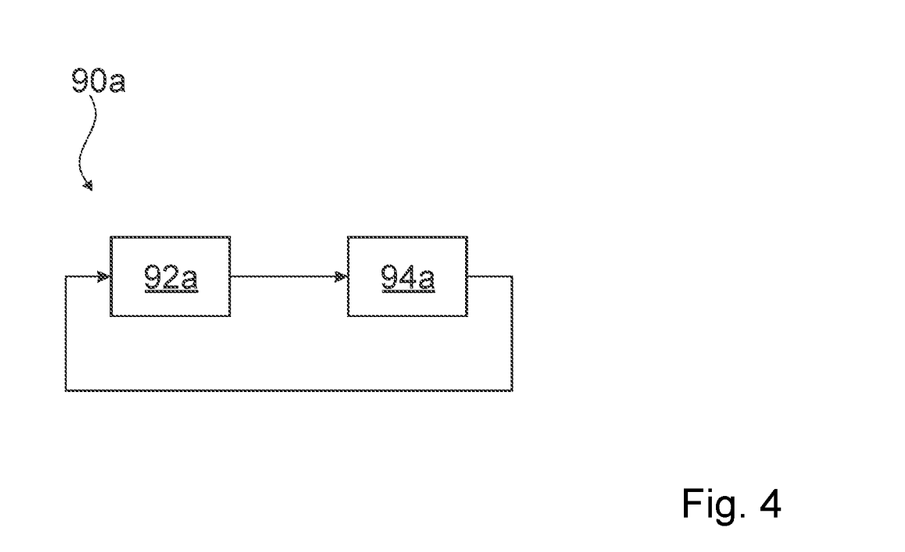

FIG. 4 shows a method 90a for an operation of the life vest container device 10a in a schematic view. The method 90a features a method step 92a and a further method step 94a. In the method step 92a, the life vest container device 10a gets checked by means of the monitoring device 44a. The characteristics are monitored in the method step 92a. A manipulation of the life vest unit 12a and of the life vest container 24a is captured via an electric and/or electronic signal. A change of the characteristics due to a manipulation is detected in the method step 92a via at least one electric and/or electronic signal. In the method step 92a, the states of the life vest container device 10a are monitored. In the method step 92a, the control and/or regulation unit 78a captures the at least one electric and/or electronic signal from the electric and/or electronic sensor units 52a, 54a, 56a. The control and/or regulation unit 78a sends an output signal to the checking system 80a and to the output units 82a, 84a. In the further method step 94a, the output units 82a, 84a output the output signal visually and acoustically, in particular to the cabin crew. In the further method step 94a, if the life vest container device 10a deviates from the predetermined state value, the output signal will change. Subsequently to the further method step 94a, the method step 92a gets repeated. The method 90a is automatically repeated at least every 60 seconds. It is conceivable that the method 90a can also contain intermediate method steps and/or further method steps which are not part of the invention.

FIGS. 5 to 10 show three further embodiments of the invention. The following description and the figures are essentially restricted to the differences between the exemplary embodiments, wherein regarding equally denominated components, in particular regarding components with the same reference numeral, the figures and/or description from the other exemplary embodiments, in particular of FIGS. 1 to 4 may be considered. For distinguishing the exemplary embodiments, the letter a has been added to the reference numerals of the exemplary embodiment of FIGS. 1 to 4, wherein, in the exemplary embodiments of FIGS. 5 to 10, the letter a has been replaced by the letters b to d.

Figure 5:
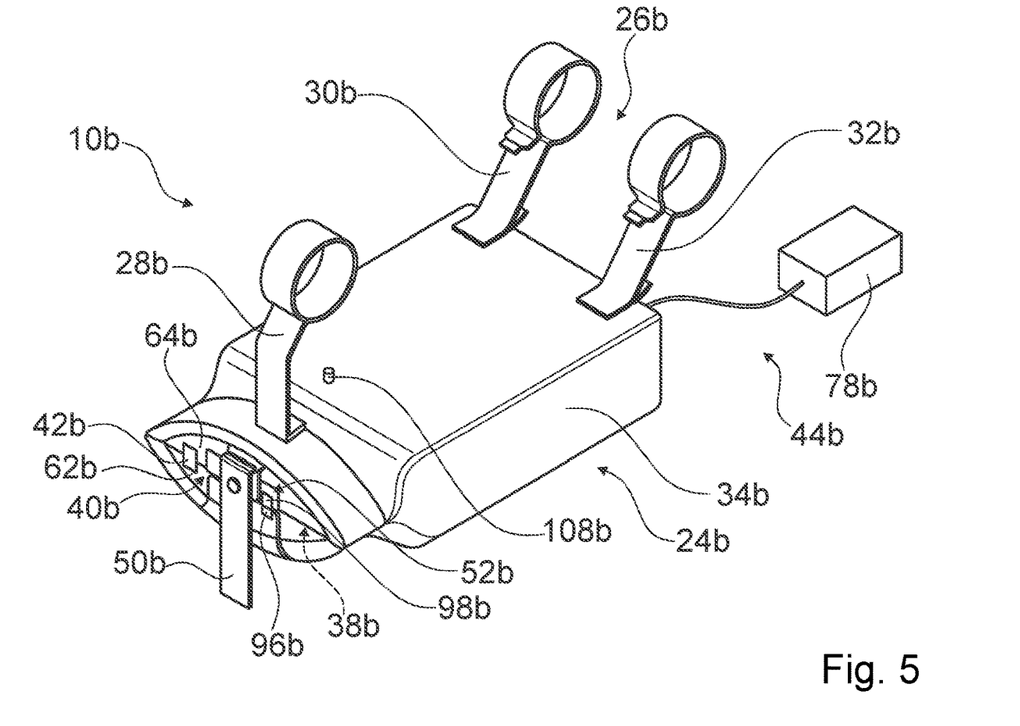

FIG. 5 shows a life vest container device 10b in a schematic perspective view in a second embodiment of the invention. The life vest container device 10b features a life vest container 24b. The life vest container device 10b comprises a fixation unit 26b. The fixation unit 26b comprises three fixation elements 28b, 30b, 32b. The life vest container 24b comprises an accommodation unit 34b. The accommodation unit 34b has an accommodation space 36b as well as an access opening 38b to the accommodation space 36b. The life vest container 24b features a sealing unit 40b. The sealing unit 40b features a seal element 42b which is configured to break by opening of the access opening 38b. The sealing unit 40b features a flap 62b and a further flap 64b, which are configured to block the access opening 38b. The life vest container device 10b features a monitoring device 44b. The monitoring device 44b is at least configured to capture a change of at least one characteristic via at least one electric and/or electronic signal. A first characteristic is related to the access opening 38b. A second characteristic is related to a life vest unit 12b. A third characteristic is related to the at least one foreign body. The monitoring device 44b comprises a control and/or regulation unit 78b. The control and/or regulation unit 78b is configured to capture an electric and/or electronic signal and to send an output signal to a checking system. The monitoring device 44b comprises one or two output units (not shown). A first output unit is embodied as a screen unit. A second output unit comprises an optical and acoustical element that is arranged in an aircraft seat region.

Figure 6:
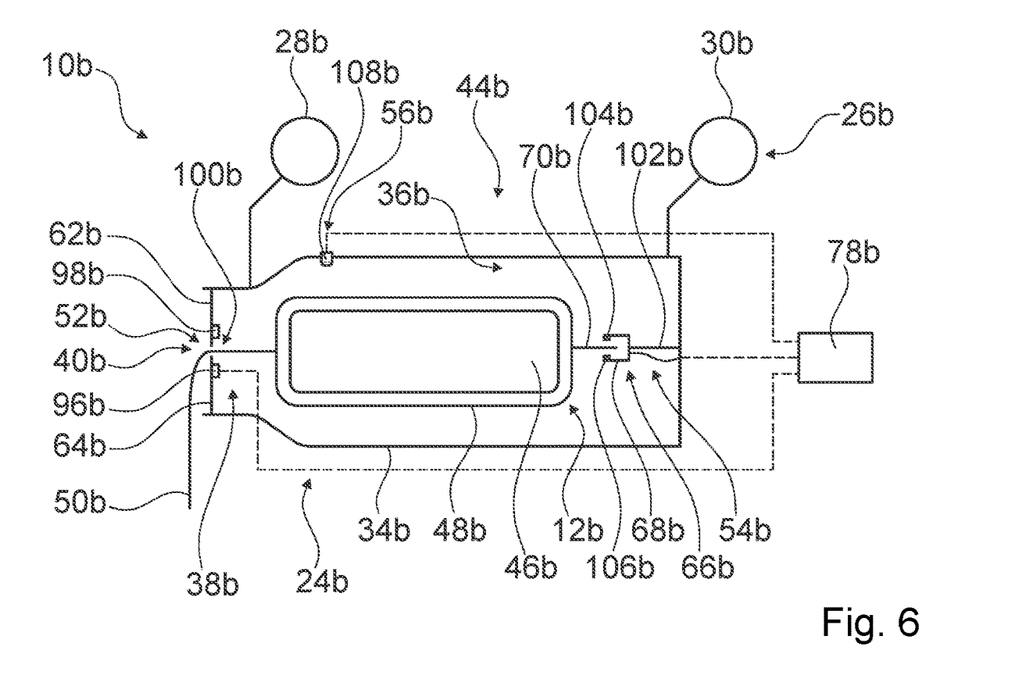

FIG. 6 shows the life vest container device 10b in a sectional side view. The life vest container device 10b comprises the life vest unit 12b. The life vest unit 12b features a life vest 46b. The life vest unit 12b features a protective cover 48b. The life vest unit 12b features a pull strap 50b. The monitoring device 44b comprises three electric and/or electronic sensor units 52b, 54b, 56b.

A first electric and/or electronic sensor unit 52b is at least configured for a detection of a manipulation of the sealing unit 40b. The first electric and/or electronic sensor unit 52b is configured to determine a change of the first characteristic. The first electric and/or electronic sensor unit 52b comprises an optical sensor 96b. The optical sensor 96b is configured to create and/or to modify the at least one electric and/or electronic signal. The optical sensor 96b is fixedly connected with the life vest container 24b. The optical sensor 96b is fixedly connected with the sealing unit 40b. The optical sensor 96b is arranged on the further flap 64b. The optical sensor 96b is embodied as an infrared sensor. The first electric and/or electronic sensor unit 52b features an infrared emitter element 98b. The infrared emitter element 98b is arranged on the flap 62a. The infrared emitter element 98b is configured to emit an infrared beam. The infrared emitter element 98b is embodied as an infrared diode. In a closed state of the sealing unit 40b, the infrared emitter element 98b is configured to send the infrared beam in a direction to the optical sensor 96b. The optical sensor 96b is configured to detect the infrared beam. The first electric and/or electronic sensor unit 52b embodies a photo-electric guard 100b. The photo-electric guard 100b is embodied by the infrared emitter element 98b and the optical sensor 96b. The photo-electric guard 100b is provided by the infrared emitter element 98b and the optical sensor 96b. The photo-electric guard 100b is configured to monitor the access opening 38b. The photo-electric guard 100b is configured to detect an opening of the sealing unit 40b.

A second electric and/or electronic sensor unit 54b is at least configured for a detection of a presence of the life vest unit 12b inside the accommodation unit 34b. The second electric and/or electronic sensor unit 54b is configured to determine a change of the second characteristic. The second electric and/or electronic sensor unit 54b comprises an electric coupling unit 66b. The electric coupling unit 66b is configured to close an electric circuit if the life vest unit 12b is moved out of its stowage position in the accommodation space 36a. The electric coupling unit 66b is configured to trigger at least one electric signal. The electric coupling unit 66b is configured to create and/or to modify the at least one electric signal. The at least one electric signal is configured for a change of state value for the second characteristic. The electric coupling unit 66b features a connector element 68b. The connector element 68b is configured for a frictional engaged connection. The connector element 68b is connected with the accommodation unit 34b. The electric coupling unit 66b features a holder element 102b. The holder element 102b is embodied as a rope. The holder element 102b is configured to couple the connector element 68b with the accommodation unit 34b. As a result, a tear-off of the connector element 68b is advantageously avoidable. The electric coupling unit 66b features a corresponding connector element 70b. The connector element 68b and the corresponding connector element 70b are configured to close the electric circuit if the connector element 68b and the corresponding connector element 70b are separated from each other. The connector element 68b features two electrical pins 104b, 106b, which are arranged opposite to each other. The connector element 68b features a spring (not shown), which is configured to press the electrical pins 104b, 106b together if the connector element 68b and the corresponding connector element 70b are separated from each other.

A third electric and/or electronic sensor unit 56b is at least configured for a sensing of a volume depending on a time characteristic. The third electric and/or electronic sensor unit 56b features a volume sensor 108b. The volume sensor 108b is configured for measuring a volume of the life vest container 24b with the life vest unit 12b arranged in the accommodation space 36b. The volume sensor 108b is configured for determining the presence of the life vest unit 12b inside the life vest container 24b and the presence of the at least one foreign body in the accommodation space 36b. The volume sensor 108b is configured to create and/or to modify the at least one electric and/or electronic signal. The volume sensor 108b is arranged in the life vest container 24b. The volume sensor 108b is arranged in the accommodation unit 34b. The volume sensor 108b is partly arranged inside the accommodation space 36b. The volume sensor 108b is embodied as a further optical sensor. The further optical sensor is implemented as an image sensor. The image sensor is configured to detect a presence of the life vest unit 12b and a presence of the at least one foreign body.

Figure 7:
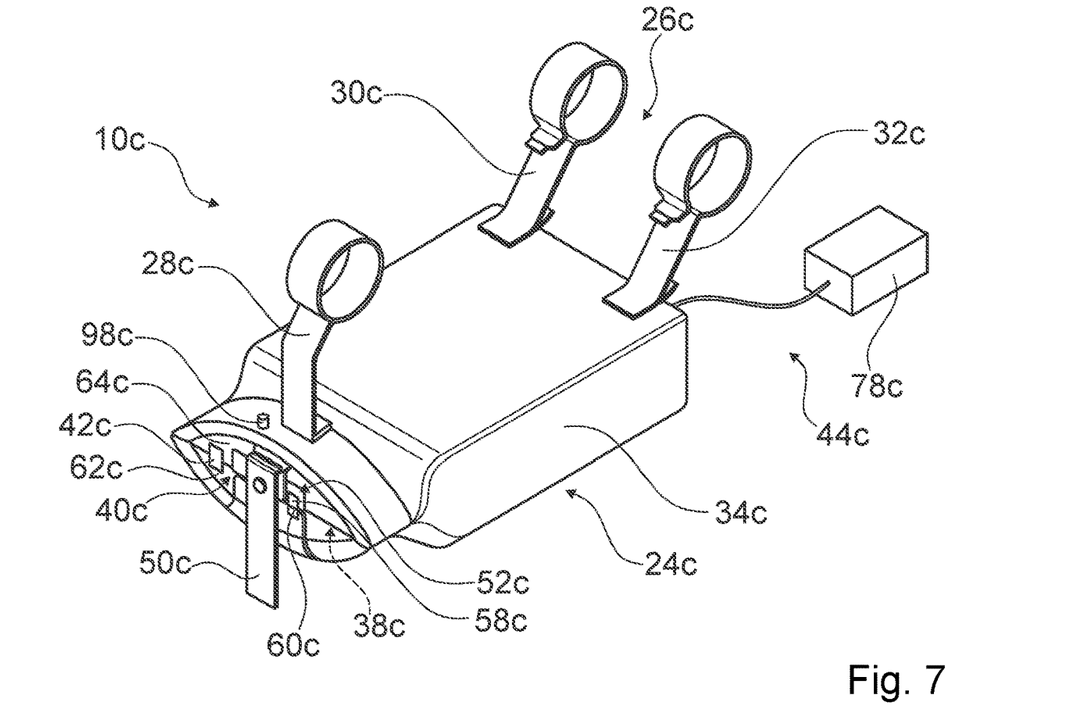

FIG. 7 shows a life vest container device 10c in a schematic perspective view in a third embodiment of the invention. The life vest container device 10c features a life vest container 24c. The life vest container device 10c comprises a fixation unit 26c. The fixation unit 26c comprises three fixation elements 28c, 30c, 32c. The life vest container 24c comprises an accommodation unit 34c. The accommodation unit 34c has an accommodation space 36c as well as an access opening 38c to the accommodation space 36c. The life vest container 24c features a sealing unit 40c. The sealing unit 40c features a seal element 42c which is configured to break by opening of the access opening 38c. The sealing unit 40c features a flap 62c and a further flap 64c, which are configured to block the access opening 38c. The life vest container device 10c features a monitoring device 44c. The monitoring device 44c is at least configured to capture a change of at least one characteristic via at least one electric and/or electronic signal. A first characteristic is related to the access opening 38c. A second characteristic is related to a life vest unit 12c. A third characteristic is related to the at least one foreign body. The monitoring device 44c comprises a control and/or regulation unit 78c. The control and/or regulation unit 78c is configured to capture an electric and/or electronic signal and to send an output signal to a checking system. The monitoring device 44c comprises two output units (not shown). A first output unit is embodied as a screen unit. A second output unit comprises an optical and acoustical element that is arranged in an aircraft seat region.

Figure 8:
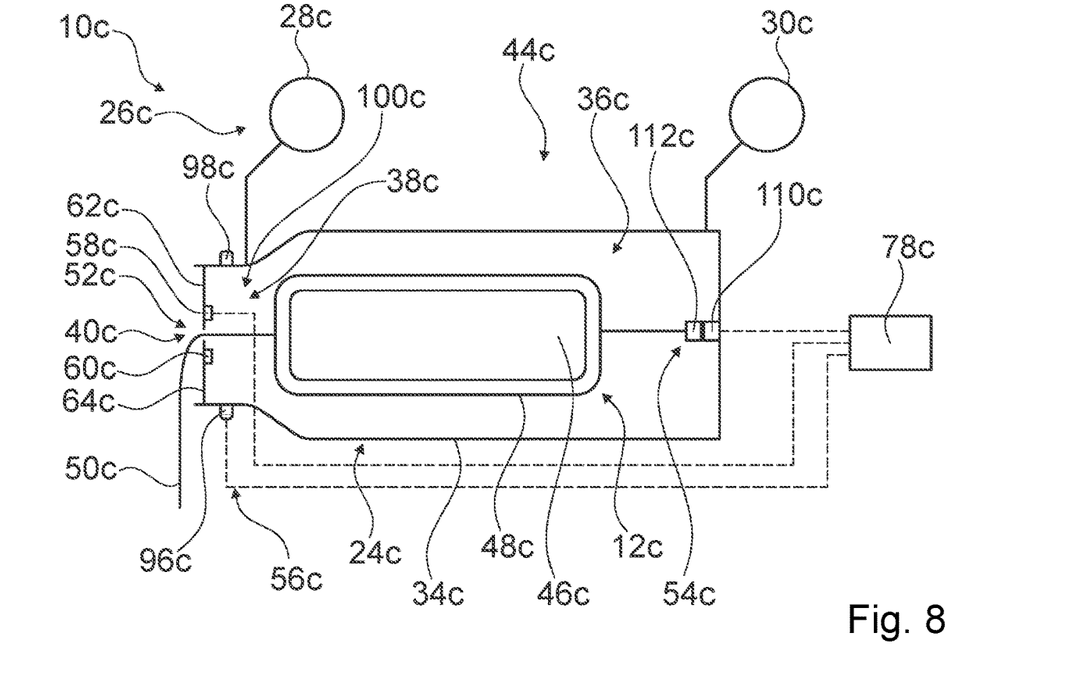

FIG. 8 shows the life vest container device 10c in a sectional side view. The life vest container device 10c comprises the life vest unit 12c. The life vest unit 12c features a life vest 46c. The life vest unit 12c features a protective cover 48c. The life vest unit 12c features a pull strap 50c. The monitoring device 44c comprises three electric and/or electronic sensor units 52c, 54c, 56c.

A first electric and/or electronic sensor unit 52c is at least configured for a detection of a manipulation of the sealing unit 40c. The first electric and/or electronic sensor unit 52c is configured to determine a change of the first characteristic. The first electric and/or electronic sensor unit 52c comprises a detection element 58c. The detection element 58c is configured to create and/or to modify the at least one electric and/or electronic signal. The detection element 58c is arranged on the flap 62c. The detection element 58c is embodied as an inductive switch. The sealing unit 40c comprises a magnetic element 60c, which is configured to change a position of a magnetic field during a movement. The magnetic element 60c is arranged on the further flap 64c.

A second electric and/or electronic sensor unit 54c is at least configured for a detection of a presence of the life vest unit 12c inside the accommodation unit 34c. The second electric and/or electronic sensor unit 54c is configured to determine a change of the second characteristic. The second electric and/or electronic sensor unit 54c comprises a further detection element 110c. The further detection element 110c is configured to create and/or to modify the at least one electric and/or electronic signal. The further detection element 110c is fixedly connected with the life vest container 24c. The detection element 110c is embodied as a contact sensor. The second electric and/or electronic sensor unit 54c features a further magnetic element 112c. The further magnetic element 112c is connected with the life vest unit 12c. The further magnetic element 112c is configured to be connected with the further detection element 110c by a magnetic force. The further magnetic element 112c is configured to change a position of a magnetic field during a movement of the life vest unit 12c out of its stowing position. The further detection element 110c is configured to sense an induction subsequently to a change of the magnetic field based on the further magnetic element 112c.

A third electric and/or electronic sensor unit 56c is at least configured for a detection of a presence of the at least one foreign body inside the accommodation unit 34c. The third electric and/or electronic sensor unit 56c is configured to determine a change of the third characteristic. The third electric and/or electronic sensor unit 56c comprises an optical sensor 96c. The optical sensor 96c is fixedly connected with the life vest container 24c. The optical sensor 96c is arranged in an area of the access opening 38c. The optical sensor 96c is embodied as an infrared sensor. The optical sensor 96c is configured to create and/or to modify the at least one electric and/or electronic signal. The third electric and/or electronic sensor unit 56c features an infrared emitter element 98c. The infrared emitter element 98c is fixedly connected with the life vest container 24c. The infrared emitter element 98c is arranged in the area of the access opening 38c. The infrared emitter element 98c is configured to emit an infrared beam. The infrared emitter element 98c is embodied as an infrared diode. The third electric and/or electronic sensor unit 56c embodies a photo-electric guard 100c. The photo-electric guard 100c is configured to monitor the access opening 38c. The photo-electric guard 100c is configured to detect a movement of the at least one foreign body through the access opening 38c. The photo-electric guard 100c is configured to detect a movement of the at least one foreign body inside the accommodation space 36c.

Figure 9:
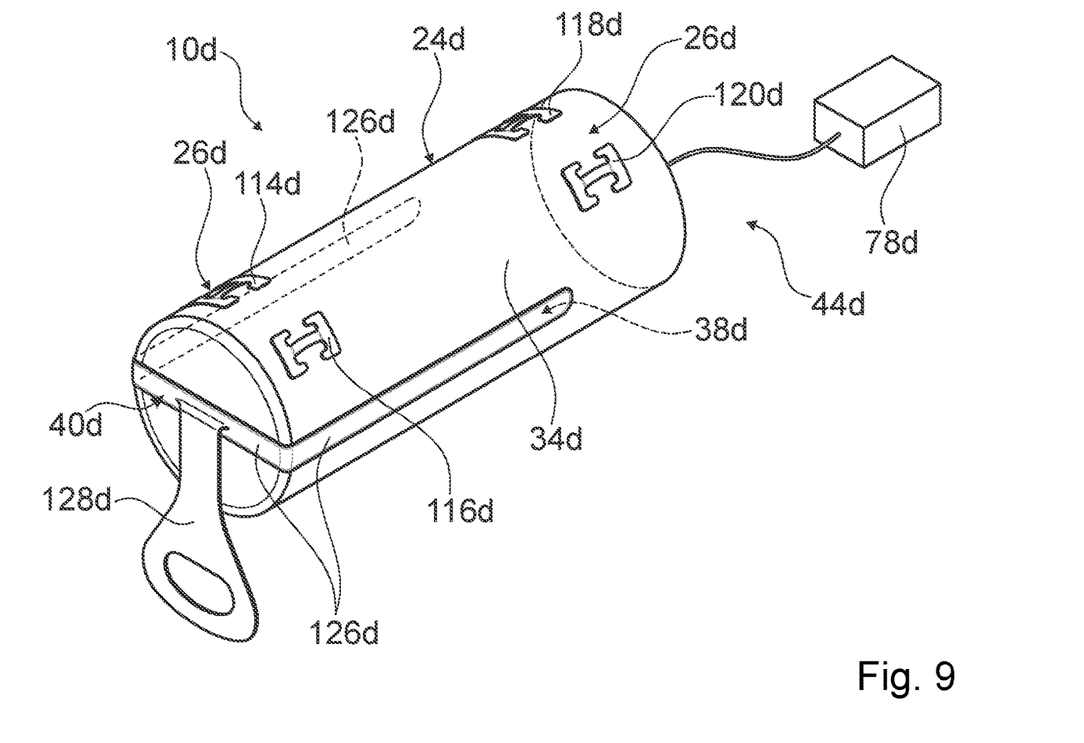

FIG. 9 shows a life vest container device 10d in a schematic perspective view in a fourth embodiment of the invention. The life vest container device 10d features a life vest container 24d. The life vest container device 10d comprises a fixation unit 26d. The fixation unit 26d comprises four fixation elements 114d, 116d, 118d, 120d. The life vest container 24d comprises an accommodation unit 34d. The accommodation unit 34d has an accommodation space 36d as well as an access opening 38d to the accommodation space 36d. The access opening 38d is permanently closed in a sealed state of the life vest container device 10d. The access opening 38d is configured in such a way that it can be opened destructively unrepeatable. The life vest container 24d features a sealing unit 40d. The sealing unit 40d features an opening element 126d which is configured to break the accommodation unit 34d open. In the sealed state of the life vest container device 10d, the opening element 126d is welded on the accommodation unit 34d. The opening element 126d is configured to be torn off from the accommodation unit 34d. If the opening element 126d is torn off, the accommodation unit 34d is unsealed and the access opening 38d is opened. The life vest container device 10d features a monitoring device 44d. The monitoring device 44d is at least configured to capture a change of two characteristics via at least one electric and/or electronic signal. A first characteristic is related to the access opening 38d. A second characteristic is related to a life vest unit 12d. The monitoring device 44d comprises a control and/or regulation unit 78d. The control and/or regulation unit 78d is configured to capture an electric and/or electronic signal and to send an output signal to a checking system. The monitoring device 44d comprises two output units (not shown). A first output unit is embodied as a screen unit. A second output unit comprises an optical and acoustical element that is arranged in an aircraft seat region.

Figure 10:
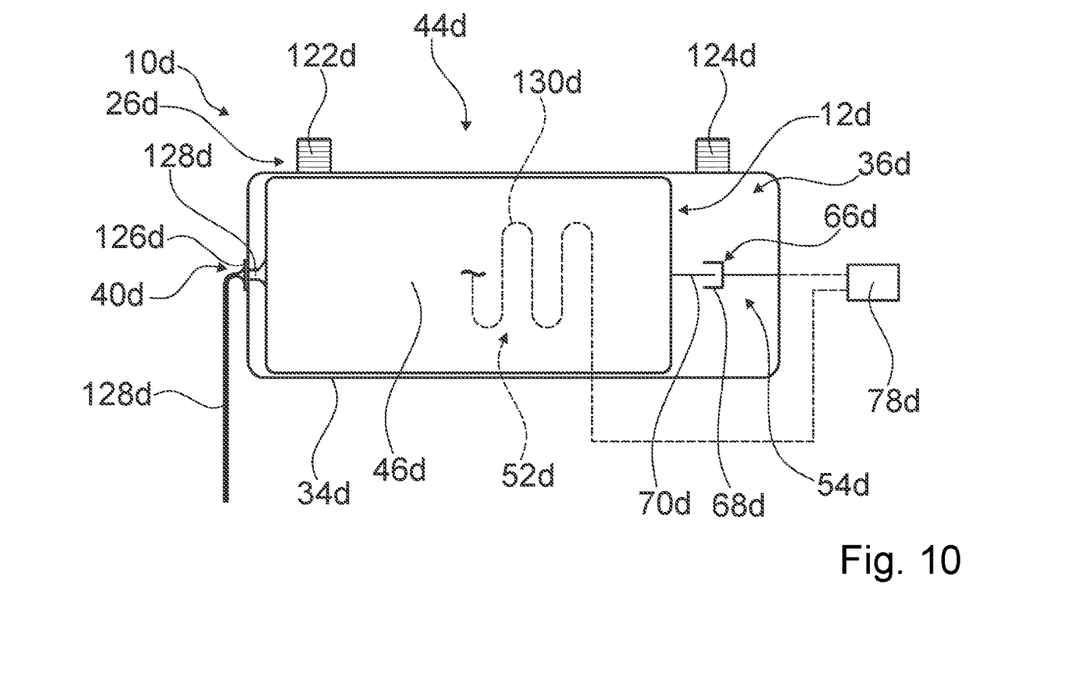

FIG. 10 shows the life vest container device 10d in a sectional side view. The life vest container device 10d comprises the life vest unit 12d. The life vest unit 12d features a life vest 46d. The life vest unit 12d does not feature a protective cover. The life vest unit 12d features a pull strap 128d. The opening element 126d is partly embodied as the pull strap 128d. The pull strap 128d is connected with the life vest 46d. The pull strap 128d is connected with the opening element 126d. The fixation unit comprises two holding straps 122d, 124d, which are configured to fixate the life vest container 24d to an aircraft seat. The holding strap 122d is configured to be connected with the fixation elements 114d, 116d. The holding strap 124d is configured to be connected with the fixation elements 118d, 120d. The monitoring device 44d comprises two electric and/or electronic sensor units 52d, 54d.

A first electric and/or electronic sensor unit 52d is at least configured for a detection of a manipulation of the sealing unit 40d. The first electric and/or electronic sensor unit 52d is configured to determine a change of the first characteristic. The first electric and/or electronic sensor unit 52d comprises a detection element 130d. The detection element 130d is configured to create and/or to modify the at least one electric and/or electronic signal. The detection element 130d is fixedly connected with the life vest container 24d. The accommodation unit 34d is embodied as a smart textile. The first electric and/or electronic sensor unit is at least partly integrated into a material of the accommodation unit 34d. In the sealed state, the accommodation unit 34d is embodied airtight. The detection element 130d is embodied as an electric wiring. The electric wiring is integrated into the material of the accommodation unit 34d. The electric wiring is embodied as one electric loop, which is placed in bows. The electric wiring is configured to open an electric circuit, when the opening element is torn off the accommodation unit 34d. The electric loop is configured to break, when the opening element is torn off the accommodation unit 34d A second electric and/or electronic sensor unit 54d is at least configured for a detection of a presence of the life vest unit 12d inside the accommodation unit 34d. The second electric and/or electronic sensor unit 54d is configured to determine a change of the second characteristic. The second electric and/or electronic sensor unit 54d comprises an electric coupling unit 66d. The electric coupling unit 66d is configured to open an electric circuit if the life vest unit 12d is moved out of its stowage position in the accommodation space 36d. The electric coupling unit 66d is configured to create and/or to modify the at least one electric and/or electronic signal. The electric coupling unit 66d is at least partly arranged inside the accommodation unit 34d. The second electric and/or electronic sensor unit 54d is coupled with the life vest unit 12d at least in the stowing position. The electric coupling unit 66d features a connector element 68d. The connector element 68d is configured for a frictional engaged connection and/or for a form-fit connection. The connector element 68d is connected with the accommodation unit 34d. The electric coupling unit 66d features a corresponding connector element 70d. The corresponding connector element 70d is connected with the life vest unit 12d. The corresponding connector element 70d is connected with the life vest 46d. The connector element 68d and the corresponding connector element 70d are configured for an electrical connection with each other. The connector element 68d and the corresponding connector element 70d are configured to get separated from each other if the life vest unit 12d is moved out of its stowage position. The connector element 68d and the corresponding connector element 70d are configured to open the electric circuit if the connector element 68d and the corresponding connector element 70d are separated from each other.

REFERENCE NUMERALS 10 life vest container device
12 life vest unit
14 aircraft seat
16 mounting unit
18 cabin floor
20 seat bottom
22 backrest
24 life vest container
26 fixation unit
28 fixation element
30 fixation element
32 fixation element
34 accommodation unit
36 accommodation space
38 access opening
40 sealing unit
42 seal element
44 monitoring device
46 life vest
48 protective cover
50 pull strap
52 sensor unit
54 sensor unit
56 sensor unit
58 detection element
60 magnetic element
62 flap
64 flap
66 electric coupling unit
68 connector element
70 connector element
72 weight sensor
74 weight sensor
76 weight sensor
78 control and/or regulation unit
80 checking system
82 output unit
84 output unit
86 listing
88 optical and acoustical element
90 method
92 method step
94 method step
96 optical sensor
98 infrared emitter element
100 photo-electric guard
102 holder element
104 pin
106 pin
108 volume sensor
110 detection element
112 magnetic element
114 fixation element
116 fixation element
118 fixation element
120 fixation element
122 holding strap
124 holding strap
126 opening element
128 pull strap
130 detection element

The invention claimed is:
1. A life vest container device with a life vest container, comprising:
an accommodation unit that has an accommodation space as well as an access opening to the accommodation space,
a monitoring device, and
a life vest unit that is configured to be arranged in the accommodation space,
wherein
the monitoring device is at least configured to capture a change of at least one characteristic via at least one electric and/or electronic signal,
the monitoring device is at least configured to capture, via the at least one electric and/or electronic signal, a manipulation of the life vest container, a removal of the life vest unit out of the life vest unit's correct stowage position, in which the life vest unit is arranged in the accommodation space, and/or a presence of at least one foreign body in the accommodation space,
the monitoring device comprises at least one electric and/or electronic sensor unit,
at least one of the at least one electric and/or electronic sensor unit is configured for sensing of a weight and/or a volume, depending on at least one time characteristic,
at least one of the at least one electric and/or electronic sensor unit is at least partly arranged on the life vest container and/or on the accommodation unit.

2. The life vest container device according to claim 1, wherein the at least one electric and/or electronic sensor unit comprises at least one electric coupling unit, which is configured to close or open an electric circuit if the life vest unit is moved out of its stowage position in the accommodation space.

3. The life vest container device according to claim 1, wherein the at least one electric and/or electronic sensor unit comprises at least one detection element, which is fixedly connected with the life vest container.

4. The life vest container device according to claim 1, wherein the at least one electric and/or electronic sensor unit comprises at least one optical sensor.

5. The life vest container device according to claim 1, wherein the monitoring device comprises at least one control and/or regulation unit, which is configured to capture the electric and/or electronic signal and to send an output signal to a checking system.

6. The life vest container device according to claim 1, wherein the monitoring device comprises at least one output unit, which is configured to output at least one output signal.

7. The life vest container device according to claim 6, wherein the at least one output unit comprises at least one optical and/or acoustical element that is arranged in an aircraft seat region.

8. An aircraft seat with a life vest container device according to claim 1.

9. A method of monitoring a life vest container device according to claim 1, comprising the life vest unit and the life vest container with the accommodation unit that defines the accommodation space for the life vest unit and the access opening to the accommodation space, the method comprising:
monitoring at least one of the life vest unit and the life vest container and
capturing a change of at least one characteristic of the life vest unit and/or the life vest container via at least one electric and/or electronic signal.

10. The life vest container device according to claim 1, wherein the at least one electric and/or electronic sensor unit comprises at least two electric and/or electronic sensor units, at least one of the at least one electric and/or electronic sensor unit determines one of the manipulation of the life vest container and the removal of the life vest unit out of the life vest unit's correct stowage position, in which the life vest unit is arranged in the accommodation space.

11. The life vest container device according to claim 1, wherein the at least one electric and/or electronic sensor unit comprises first, second, and third electric and/or electronic sensor units, the first electric and/or electronic sensor unit determines a manipulation of the life vest container, the second electric and/or electronic sensor unit determines the removal of the life vest unit out of the life vest unit's correct stowage position, in which the life vest unit is arranged in the accommodation space, and the third electric and/or electronic sensor unit determines a presence of at least one foreign body in the accommodation space.

12. A life vest container device with a life vest container, comprising:

an accommodation unit having an accommodation space and an access opening to the accommodation space;

a life vest unit arranged in the accommodation space; and a monitoring device configured to determine a change of at least two characteristics of the life vest container, wherein the monitoring device is configured to detect at least two of a manipulation of the life vest container, a removal of the life vest unit out of the life vest unit's correct stowage position in the accommodation space, and a presence of at least one foreign body in the accommodation space, the monitoring device comprises two or more sensor units, at least one of the two or more sensor units is configured to sense at least one of a weight and a volume in the accommodation space, at least one of the two or more sensor units is at least partly arranged on one of the life vest container and the accommodation unit.

13. The life vest container device according to claim 12, wherein the monitoring device is configured to detect all three of the manipulation of the life vest container, the removal of the life vest unit out of the life vest unit's correct stowage position in the accommodation space, and the presence of at least one foreign body in the accommodation space.

14. The life vest container device according to claim 12, wherein the at two or more sensor units comprises at least one electric coupling unit that is configured to open or close an electric circuit if the life vest unit is moved out of a proper life vest stowage position in the accommodation space.

* * * * *